(12) United States Patent
Tang et al.

(10) Patent No.: US 11,605,213 B2
(45) Date of Patent: Mar. 14, 2023

(54) CITRUS IDENTIFICATION METHOD BASED ON ROUNDNESS INTEGRITY CORRECTION

(71) Applicant: Guangdong Polytechnic Normal University, Guangzhou (CN)

(72) Inventors: Yu Tang, Guangzhou (CN); Shaoming Luo, Guangzhou (CN); Weizhao Chen, Guangzhou (CN); Jiahao Li, Guangzhou (CN); Jiepeng Yang, Guangzhou (CN); Yiqing Fu, Guangzhou (CN); Jinfei Zhao, Guangzhou (CN); Xiaodi Zhang, Guangzhou (CN); Qiwei Guo, Guangzhou (CN); Xincai Zhuang, Guangzhou (CN); Huasheng Huang, Guangzhou (CN); Chaojun Hou, Guangzhou (CN); Jiajun Zhuang, Guangzhou (CN); Aimin Miao, Guangzhou (CN)

(73) Assignee: GUANGDONG POLYTECHNIC NORMAL UNIVERSITY, Guangzhou (CN)

( * ) Notice: Subject to any disclaimer, the term of this patent is extended or adjusted under 35 U.S.C. 154(b) by 0 days.

(21) Appl. No.: 17/742,701

(22) Filed: May 12, 2022

(65) Prior Publication Data
US 2022/0383610 A1     Dec. 1, 2022

(30) Foreign Application Priority Data
May 25, 2021   (CN) .......................... 202110571080.6

(51) Int. Cl.
*G06V 10/44*     (2022.01)
*G06T 7/70*      (2017.01)
(Continued)

(52) U.S. Cl.
CPC ................ *G06V 10/44* (2022.01); *G06T 7/70* (2017.01); *G06V 10/761* (2022.01); *G06V 10/82* (2022.01);
(Continued)

(58) Field of Classification Search
CPC ...... G06V 10/44; G06V 10/761; G06V 10/82; G06V 20/68; G06T 7/70; G06T 2207/30188
See application file for complete search history.

(56) References Cited

PUBLICATIONS

Tran, Chi Cuong, et al. "Automatic dragon fruit counting using adaptive thresholds for image segmentation and shape analysis." 2017 4th NAFOSTED Conference on Information and Computer Science. IEEE, 2017. (Year: 2017).*

(Continued)

*Primary Examiner* — Vu Le
*Assistant Examiner* — Tracy Mangialaschi
(74) *Attorney, Agent, or Firm* — Getech Law LLC; Jun Ye (57) ABSTRACT

A citrus identification method comprises: performing first-time image acquisition processing on a target citrus tree to obtain a first image; inputting the first image into a first citrus fruit identification model to be processed to obtain a first identification result sequence; performing area interception processing on the first image to obtain a citrus fruit area; obtaining roundness integrity numerical values; selecting an appointed roundness integrity numerical value, and acquiring a defect position of an appointed citrus fruit in the first image; determining a first spatial range and a second spatial range; performing both first spray injection treatment and second spray injection treatment; performing second-time image acquisition processing to obtain a second image; inputting the second image into a second citrus fruit identification model to be processed to obtain a second identi- (Continued)

fication result; and generating a citrus fruit identification result.

6 Claims, 2 Drawing Sheets

(51) Int. Cl.
    *G06V 20/68*     (2022.01)
    *G06V 10/74*     (2022.01)
    *G06V 10/82*     (2022.01)

(52) U.S. Cl.
    CPC .... *G06V 20/68* (2022.01); *G06T 2207/30188* (2013.01)

(56) References Cited

PUBLICATIONS

Minaei, S., M. Jafari, and N. Safaie. "Design and development of a rose plant disease-detection and site-specific spraying system based on a combination of infrared and visible images." Journal of Agricultural Science and Technology 20.1 (2018): 23-36. (Year: 2018).*

Gan, Hao, et al. "An Active Thermography Method for Immature Citrus Fruit Detection." 14th International Conference on Precision Agriculture, 8p. Montreal, Canada. 2018. (Year: 2018).*

* cited by examiner

CITRUS IDENTIFICATION METHOD BASED ON ROUNDNESS INTEGRITY CORRECTION

TECHNICAL FIELD

The application relates to the field of computers, in particular to a citrus identification method based on roundness integrity correction, a computer device and a storage medium.

BACKGROUND

Identification of citruses on citrus trees is one of significant aspects in intelligent and automated agriculture. Conventional citrus identification schemes usually acquire images by using cameras and then identify the images to obtain identification results. However, the conventional citrus identification schemes are inadequate in accuracy due to precision restriction of the cameras and severe mutual shelter of fruits in a field fruit tree condition.

SUMMARY

The application provides a citrus identification method based on roundness integrity correction, including the following steps:

S1. performing first-time image acquisition processing on a target citrus tree by using a pre-arranged optical camera to obtain a first image;

S2. inputting the first image into a preset first citrus fruit identification model to be processed to obtain a first identification result sequence, wherein the first citrus fruit identification model is trained based on a convolutional neural network model, and the first identification result sequence is a set of fruits identified as citrus fruits in the first image;

S3. performing area interception processing on the first image according to the first identification result sequence to obtain a plurality of citrus fruit areas corresponding to the first identification result sequence;

S4. calculating the citrus fruit areas according to a preset roundness integrity calculation method to obtain a plurality of roundness integrity numerical values respectively corresponding to the plurality of citrus fruit areas;

S5. selecting an appointed roundness integrity numerical value from the plurality of roundness integrity numerical values according to a rule that the numerical value is smaller than a preset roundness integrity threshold value, marking the citrus fruit corresponding to the appointed roundness integrity numerical value as an appointed citrus fruit, and acquiring a defect position of the appointed citrus fruit in the first image;

S6. acquiring a spatial position corresponding to the appointed roundness integrity numerical value, and determining a first spatial range and a second spatial range according to the spatial position, wherein the first spatial range covers the whole appointed citrus fruit, and the second spatial range only covers the defect position of the appointed citrus fruit;

S7. performing both first spray injection treatment in the first spatial range and second spray injection treatment in the second spatial range, wherein an atomizing raw material used in the first spray injection treatment is different from an atomizing raw material used in the second spray injection treatment;

S8. after a preset time, performing second-time image acquisition processing on the spatial position by using the pre-arranged optical camera to obtain a second image;

S9. inputting the second image into a preset second citrus fruit identification model to be processed to obtain a second identification result, wherein the second citrus fruit identification model is trained based on a convolutional neural network model; and S10. generating a final citrus fruit identification result according to the second identification result and the first citrus fruit identification result sequence.

Further, before the step S2 of inputting the first image into a preset first citrus fruit identification model to be processed to obtain a first identification result sequence, wherein the first citrus fruit identification model is trained based on a convolutional neural network model, and the first identification result sequence is a set of fruits identified as citrus fruits in the first image, the method includes:

S11. performing integral image acquisition processing on a plurality of preset sample citrus trees to obtain a plurality of first sample tree images;

S12. performing first manual marking processing on the plurality of first sample tree images to mark the citrus fruits on each of the first sample tree images, and marking the first sample tree images after first manual marking processing so as to obtain a plurality of second sample tree images;

S13. dividing the plurality of second sample tree images according to a preset rule to obtain a plurality of training tree images and a plurality of verifying tree images;

S14. invoking a preset Faster R-CNN model, and inputting the plurality of training tree images into the Faster R-CNN model to be trained to obtain an intermediate model;

S15. verifying the intermediate model by utilizing the plurality of verifying tree images to obtain a verification result, and judging whether the verification result is that the intermediate model passes the verification or not; and S16. marking the intermediate model as the first citrus fruit identification model if the verification result is that the intermediate model passes the verification.

Further, the step S4 of calculating the citrus fruit areas according to a preset roundness integrity calculation method to obtain a plurality of roundness integrity numerical values respectively corresponding to the plurality of citrus fruit areas includes:

S401. performing binarization processing on the citrus fruit areas according to a preset binarization method to obtain a binarized image;

S402. extracting a contour of citrus fruit from the binarized image, and performing similarity calculation on the contour of citrus fruit and a preset roundness to obtain a similarity numerical value; and S403. marking the similarity numerical value as the roundness integrity numerical value so as to obtain the plurality of roundness integrity numerical values respectively corresponding to the plurality of citrus fruit areas.

Further, in the step S7 of performing both first spray injection treatment in the first spatial range and second spray injection treatment in the second spatial range, an atomizing raw material used in the first spray injection treatment being different from an atomizing raw material used in the second spray injection treatment, wherein the atomizing raw material used in the first spray injection treatment is water and the atomizing raw material used in the second spray injection treatment is a pesticide liquid.

Further, in the step S7 of performing both first spray injection treatment in the first spatial range and second spray injection treatment in the second spatial range, an atomizing raw material used in the first spray injection treatment being different from an atomizing raw material used in the second spray injection treatment, wherein the atomizing raw material used in the first spray injection treatment is a first mixed liquid that is composed of water and a first powder, and the first powder can stress-emit visible light of a first color in an ultraviolet environment; and the atomizing raw material used in the second spray injection treatment is a second mixed liquid that is composed of water and a second powder, and the second powder can stress-emit visible light of a second color in an infrared environment;

the step S8 of, after a preset time, performing second-time image acquisition processing on the spatial position by using the pre-arranged optical camera to obtain a second image includes:

S801. after the preset time, performing a light supplementing operation for the spatial position by using a preset infrared flashlight and a preset ultraviolet flashlight, and performing second-time image acquisition processing on the spatial position by using the pre-arranged optical camera to obtain the second image.

Further, the step S10 of generating a final citrus fruit identification result according to the second identification result and the first citrus fruit identification result sequence includes:

S101. determining an appointed member corresponding to the appointed roundness integrity numerical value from the first identification result sequence according to a corresponding relation among the roundness integrity numerical value, the citrus fruit area and the first identification result;

S102. performing member excluding processing on the first identification result sequence to remove the appointed member, so as to obtain a second sequence;

S103. excluding the identification results that are not identified as citrus fruits from all the second identification results, so as to obtain a third sequence; and S104. merging the second sequence with the third sequence to obtain the final citrus fruit identification result.

The application provides a citrus identification device based on roundness integrity correction, including the following steps:

a first image acquisition unit for performing first-time image acquisition processing on a target citrus tree by using a pre-arranged optical camera to obtain a first image;

a first identification result sequence acquisition unit for inputting the first image into a preset first citrus fruit identification model to be processed to obtain a first identification result sequence, wherein the first citrus fruit identification model is trained based on a convolutional neural network model, and the first identification result sequence is a set of fruits identified as citrus fruits in the first image;

a citrus fruit area acquisition unit for performing area interception processing on the first image according to the first identification result sequence to obtain a plurality of citrus fruit areas corresponding to the first identification result sequence;

a roundness integrity calculation unit for calculating the citrus fruit areas according to a preset roundness integrity calculation method to obtain a plurality of roundness integrity numerical values respectively corresponding to the plurality of citrus fruit areas;

a defect position acquisition unit for selecting an appointed roundness integrity numerical value from the plurality of roundness integrity numerical values according to a rule that the numerical value is smaller than a preset roundness integrity threshold value, marking the citrus fruit corresponding to the appointed roundness integrity numerical value as an appointed citrus fruit, and acquiring a defect position of the appointed citrus fruit in the first image;

a spatial position acquisition unit for acquiring a spatial position corresponding to the appointed roundness integrity numerical value, and determining a first spatial range and a second spatial range according to the spatial position, wherein the first spatial range covers the whole appointed citrus fruit, and the second spatial range only covers the defect position of the appointed citrus fruit;

a spray injection unit for performing both first spray injection treatment in the first spatial range and second spray injection treatment in the second spatial range, wherein an atomizing raw material used in the first spray injection treatment is different from an atomizing raw material used in the second spray injection treatment;

a second image acquisition unit for, after a preset time, performing second-time image acquisition processing on the spatial position by using the pre-arranged optical camera to obtain a second image;

a second identification result acquisition unit for inputting the second image into a preset second citrus fruit identification model to be processed to obtain a second identification result, wherein the second citrus fruit identification model is trained based on a convolutional neural network model; and a final citrus fruit identification result acquisition unit for generating a final citrus fruit identification result according to the second identification result and the first citrus fruit identification result sequence.

The application provides a computer device, including a memory and a processor, the memory storing a computer program, wherein the processor realizes the steps of any one method when executing the computer program.

The application provides a computer readable storage medium, having computer readable instructions stored therein, wherein the steps of any one method is realized when the instructions are executed by the processor.

The application discloses a citrus identification method and device based on roundness integrity correction, a computer device and a storage medium. The method includes: performing first-time image acquisition processing on a target citrus tree to obtain a first image; inputting the first image into a preset first citrus fruit identification model to be processed to obtain a first identification result sequence; performing area interception processing on the first image to obtain a citrus fruit area; obtaining roundness integrity numerical values; selecting an appointed roundness integrity numerical value from the plurality of roundness integrity numerical values, and acquiring a defect position of an appointed citrus fruit in the first image; determining a first spatial range and a second spatial range; performing both first spray injection treatment and second spray injection treatment; performing second-time image acquisition processing to obtain a second image; inputting the second image into a second citrus fruit identification model to be processed to obtain a second identification result; and generating a final citrus fruit identification result according to the second identification result and the first identification result sequence. Therefore, the accuracy of citrus identification is improved.

The application has the following characteristics:

1. By means of an intrinsic characteristic that there is a difference between adsorption capacities of the citrus fruits to spray and adsorption capacities of the citrus trees to spray, both first spray injection treatment in the first spatial range and second spray injection treatment in the second spatial range are performed, and the second images are then acquired to ensure that there is a difference between the second images and the first image so as to highlight the citrus fruits, thereby facilitating solution of inability to determine citruses when the citruses are identified by utilizing the first image (for example, due to conditions of precision restriction of the cameras, shelter of the fruits and the like). Therefore, the identification accuracy is improved. As different spatial positions are injected by double atomizing, the highlighting effect of the citrus fruits can be further improved, so that the final identification accuracy is guaranteed.

2. A two-stage citrus identification mode is adopted to improve the identification accuracy of the citruses. Image acquisition and identification of the citrus trees in the first stage belong to large-scale identification. Local image acquisition and identification in hardly determined areas in the second stage belongs to small-scale identification. Therefore, correspondingly, the input of the first citrus fruit identification model in the first stage is the citrus tree image, and the citrus tree image shall also be acquired when the first citrus fruit identification model is trained; the input of the second citrus fruit identification model in the second stage is the citrus fruit image (or it is more accurately described to be suspected to be the image of the citrus fruit in the spatial position), and the citrus fruit image (it shall be the image acquired after double atomizing treatment) shall also be acquired when the second citrus fruit identification model is trained.

3. The design of roundness integrity is adopted to determine whether there is a probability that the citrus fruits are sheltered or adhere to each other or not, which is regarded as a basis of deciding whether citrus identification in the second stage is adopted or not.

Further description will be further made on implementation, functional characteristics and advantages of the object of the application with reference to drawings in combination of embodiments.

DETAILED DESCRIPTION OF EMBODIMENTS

In order to make purposes, technical schemes and advantages of the application clearer, the application is further described in detail below in combination with drawings and embodiments. It is be understood that the specific examples described herein are merely used for explaining the application, instead of limiting the application.

Figure 1:
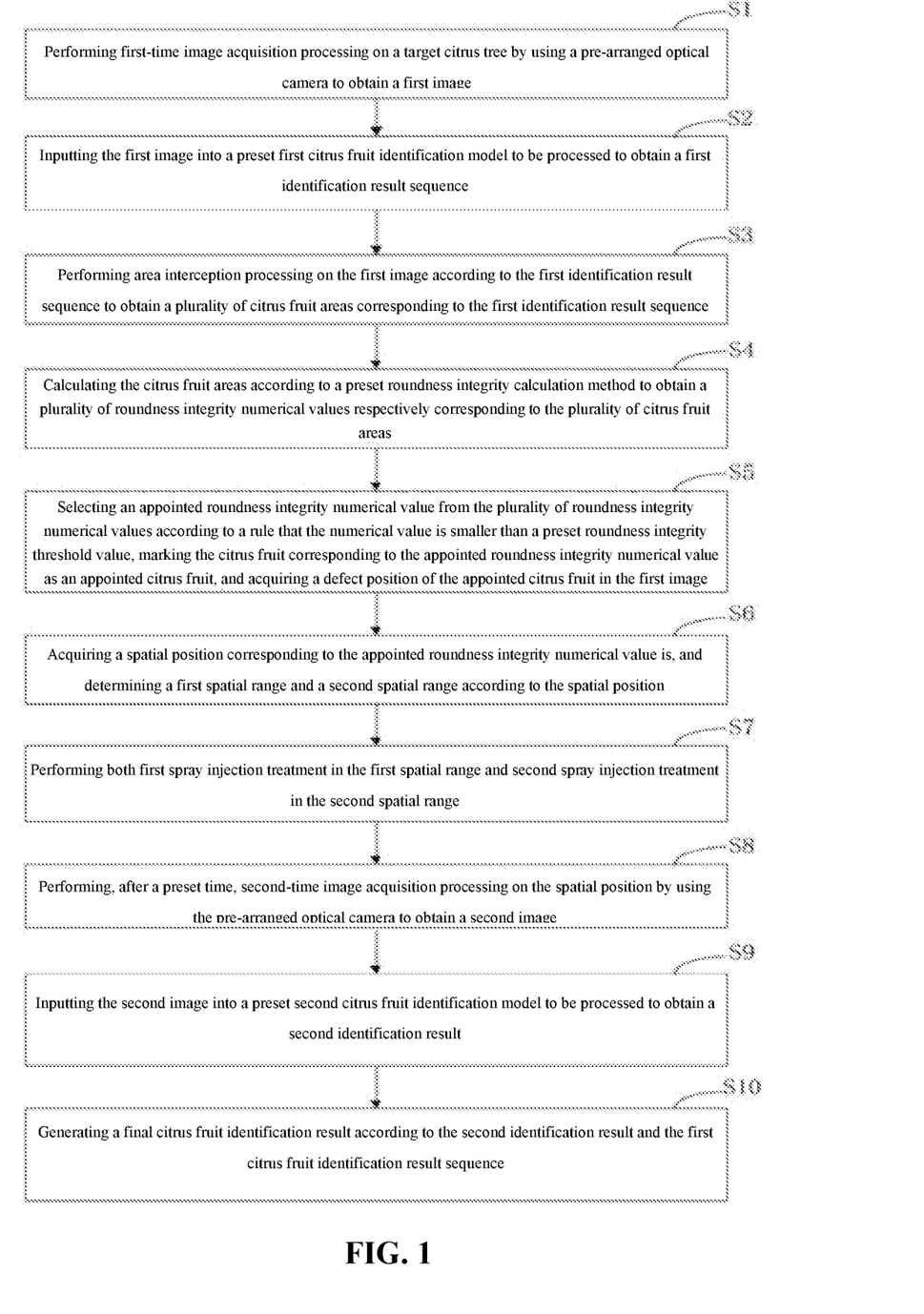
FIG. 1 is a flow schematic diagram of a citrus identification method based on roundness integrity correction of an embodiment of the application.

Referring to FIG. 1, the embodiment of the application provides a citrus identification method based on roundness integrity correction, including the following steps:

S1. first-time image acquisition processing is performed on a target citrus tree by using a pre-arranged optical camera to obtain a first image;

S2. the first image is inputted into a preset first citrus fruit identification model to be processed to obtain a first identification result sequence, wherein the first citrus fruit identification model is trained based on a convolutional neural network model, and the first identification result sequence is a set of fruits identified as citrus fruits in the first image;

S3. area interception processing is performed on the first image according to the first identification result sequence to obtain a plurality of citrus fruit areas corresponding to the first identification result sequence;

S4. the citrus fruit areas are calculated according to a preset roundness integrity calculation method to obtain a plurality of roundness integrity numerical values respectively corresponding to the plurality of citrus fruit areas;

S5. an appointed roundness integrity numerical value is selected from the plurality of roundness integrity numerical values according to a rule that the numerical value is smaller than a preset roundness integrity threshold value, the citrus fruit corresponding to the appointed roundness integrity numerical value is marked as an appointed citrus fruit, and a defect position of the appointed citrus fruit in the first image is acquired;

S6. a spatial position corresponding to the appointed roundness integrity numerical value is acquired, and a first spatial range and a second spatial range are determined according to the spatial position, wherein the first spatial range covers the whole appointed citrus fruit, and the second spatial range only covers the defect position of the appointed citrus fruit;

S7. both first spray injection treatment in the first spatial range and second spray injection treatment in the second spatial range are performed, wherein an atomizing raw material used in the first spray injection treatment is different from an atomizing raw material used in the second spray injection treatment;

S8. after a preset time, second-time image acquisition processing is performed on the spatial position by using the pre-arranged optical camera to obtain a second image;

S9. the second image is inputted into a preset second citrus fruit identification model to be processed to obtain a second identification result, wherein the second citrus fruit identification model is trained based on a convolutional neural network model; and S10. a final citrus fruit identification result is generated according to the second identification result and the first citrus fruit identification result sequence.

As described in the steps S1-S3, first-time image acquisition processing is performed on the target citrus tree by using a pre-arranged optical camera to obtain the first image; the first image is inputted into the preset first citrus fruit identification model to be processed to obtain the first identification result sequence, wherein the first citrus fruit identification model is trained based on the convolutional neural network model, and the first identification result sequence is a set of fruits identified as citrus fruits in the first image; and area interception processing is performed on the first image according to the first identification result sequence to obtain the plurality of citrus fruit areas corresponding to the first identification result sequence.

The optical camera is a device capable of acquiring visible light signals. Due to influence of an implement environment, there can be one or more optical cameras. When there are a plurality of optical cameras, the plurality of optical cameras are adjacent, namely, a plurality of connecting lines of the plurality of optical cameras corresponding to any one point on a central axis of the target citrus tree. The maximum value of a corresponding included angle between every two of the plurality of connecting lines is smaller than a preset angle threshold value, for example 0-20 degrees. This is because of difficulty in widely arranging the optical cameras to identify the citruses in the field fruit tree environment, so that it is difficult to implement an operation, for example, acquiring the images after encircling the target citrus tree at 360 degrees in all direction. The first image is inputted into a preset first citrus fruit identification model to be processed to obtain a first identification result sequence, wherein the first citrus fruit identification model is trained based on a convolutional neural network model, and the first identification result sequence is a set of fruits identified as citrus fruits in the first image. It is to be noted that the first citrus fruit identification model is used for identifying the citrus fruits in the citrus tree images. The convolutional neural network model is a deep learning neural network model which is particularly suitable for processing image data. As the first citrus fruit identification model is used for identifying the citrus fruits in the citrus tree images, the output of the first citrus fruit identification model will be the set of the citrus fruits. As the identified citrus fruits occupy certain areas in the first image, area interception processing is performed on the first image according to the first identification result sequence to obtain a plurality of citrus fruit areas corresponding to the first identification result sequence. The reason for area interception processing on the citrus fruits is that the first citrus fruit is obtained by processing the large-scale citrus tree image, with problems of shelter characteristics that may probably exist in an actual scene and restriction of the shooting positions of the optical cameras. Thus, there may be mistakenly identified members in the first identification result sequence, and it is needed to perform targeted identification processing again.

Further, before the step S2 of inputting the first image into a preset first citrus fruit identification model to be processed to obtain a first identification result sequence, wherein the first citrus fruit identification model is trained based on a convolutional neural network model, and the first identification result sequence is a set of fruits identified as citrus fruits in the first image, the method includes:

S11. integral image acquisition processing is performed on a plurality of preset sample citrus trees to obtain a plurality of first sample tree images;

S12. first manual marking processing is performed on the plurality of first sample tree images to mark the citrus fruits on each of the first sample tree images, and the first sample tree images are marked after first manual marking processing so as to obtain a plurality of second sample tree images;

S13. the plurality of second sample tree images are divided according to a preset rule to obtain a plurality of training tree images and a plurality of verifying tree images;

S14. a preset Faster R-CNN model is invoked, and the plurality of training tree images are inputted into the Faster R-CNN model to be trained to obtain an intermediate model;

S15. the intermediate model is verified by utilizing the plurality of verifying tree images to obtain a verification result, and whether the verification result is that the intermediate model passes the verification or not is judged; and S16. the intermediate model is marked as the first citrus fruit identification model if the verification result is that the intermediate model passes the verification.

Although in the above-mentioned steps, first manual marking processing is performed on the plurality of first sample tree images to mark the citrus fruits on each of the first sample tree images, in order to guarantee higher fault tolerance, such operations can further be performed when first manual marking processing is performed according to characteristics of identification in the two stages: first manual marking processing is performed on the plurality of first sample tree images to mark the citrus fruits on each of the first sample tree images; then second manual marking processing is performed on the plurality of first sample tree images to mark the positions suspected to be the citrus fruits in the first sample tree images; and then the first sample tree images subjected to first manual marking processing and second manual marking processing are marked as second sample tree images to obtain a plurality of second sample tree images, wherein a differentiating mode of the suspected citrus fruits can be any feasible mode, for example, manual differentiation by naked eyes. In this way, at the cost of sacrificing a part of identification accuracy, a condition of leaking the citrus fruits is avoided. Moreover, the identification accuracy sacrificed at the moment will be compensated in the citrus fruit identification process in the second stage, so that the final identification accuracy can still be guaranteed. The preset rule can be any feasible rule. For example, division at a preset proportion is performed by way of random division. The Faster R-CNN model is a convolutional neural network model. Compared with a conventional convolutional neural network model, the Faster R-CNN model completes selection of a candidate frame by utilizing region proposal networks (RPN), which is suitable for being applied to the application. Then the plurality of training tree images are inputted into the Faster R-CNN model to be trained so as to obtain an intermediate model; the intermediate model is verified by utilizing the plurality of verifying tree images to obtain a verification result, and whether the verification result is that the intermediate model passes the verification or not is judged; and if the verification result is that the intermediate model passes the verification, the intermediate model is marked as the first citrus fruit identification model, so that it is guaranteed that the first citrus fruit identification model is qualified for an identification task.

Further, in the identification or training process of the first citrus fruit identification model in the first stage, the sampling threshold value can be dynamically adjusted by means of quantitative distribution of target samples by changing sampling threshold value setting modes of fixed non-target and target samples in an original model without considering an area-of-interest of a proposed ignored area. By adopting an end-to-end training mode, quantitative equilibrium of the target samples and remarkable visibility of the local area in the training process are maintained as far as possible. In addition, in view of recommendation of network RPN model in the area, a parameter setting mode of a default anchor point thereof is relatively suitable for a universal target identification problem usually with only three ratios of width to height and three heights (marked as S3R3). The mode cannot be directly applied to a ripe fruit detection task (only a target sample detection task is concerned). It is planned to add anchor dimensions such as several factors of ratios of width to height and heights, for example S9R1, S15R1 and S5R3, to fit the identification problem of a specific fruit target. In S9R1, the anchor point with single average ratio of width to height is used, and 9 different proportions are used. Started from a few pixel (for example, 20-pixel) height, a zoom step length is 1.1x-1.5x; in S15R1, minimum enclosing rectangles of all sample data are sequenced according to imaging height pixel number of the ripe citrus fruit image, and its range is divided into several quantized intervals, the sample number in each of which is equal, an a plurality of division points serve as PRN scales to generate a proper ratio (for example 1/0.46); in S5R3, two small sizes are supplemented to match a detection problem of small targets further for the problem that the imaging sizes of a part of fruit images may be inconsistent; a residual network (ResNet) is selected as a trunk network to ensure acquisition of identification performance superior to that of VGG16, Conv4 is taken as an RoIs pooling layer of the area-of-interest in ResNet50 and ResNet101, and the upsampling ratio of the inputted image is set to be 1.5 times, thereby detecting and positioning the ripe citrus fruit target with various imaging dimensions.

As described in the steps S4-S6, the citrus fruit areas are calculated according to a preset roundness integrity calculation method to obtain a plurality of roundness integrity numerical values respectively corresponding to the plurality of citrus fruit areas; an appointed roundness integrity numerical value is selected from the plurality of roundness integrity numerical values according to a rule that the numerical value is smaller than a preset roundness integrity threshold value, the citrus fruit corresponding to the appointed roundness integrity numerical value is marked as an appointed citrus fruit, and a defect position of the appointed citrus fruit in the first image is acquired; a spatial position corresponding to the appointed roundness integrity numerical value is acquired, and a first spatial range and a second spatial range are determined according to the spatial position, wherein the first spatial range covers the whole appointed citrus fruit, and the second spatial range only covers the defect position of the appointed citrus fruit.

The preset roundness integrity calculation method can be any feasible method intended to determine whether there are the integral citrus fruits or not truly in the citrus fruit areas. The reason why the roundness integrity calculation method is adopted is that the main reason of identification errors in citrus fruit identification in the first stage is shelter. If there is no shelter, an integral citrus fruit is round or approximately round in image. If the sheltered area is too large, the identification errors may be generated, so that it may be confused with suspected shapes in the field fruit tree environment. As the identification mode with relatively low precision is used in the first stage, the result identified in the first stage includes an imprecise citrus fruit identification result. If it is necessary to further identify, the precise citrus fruit area is removed by utilizing the roundness integrity calculation method to reduce the data size needed to be processed for citrus identification in the second stage. Therefore, the plurality of roundness integrity numerical values respectively corresponding to the plurality of citrus fruit areas are calculated. The roundness integrity numerical values, as the name suggests, are parameters for describing whether there is integral roundness in the citrus fruit areas.

An appointed roundness integrity numerical value is then selected from the plurality of roundness integrity numerical values according to a rule that the numerical value is smaller than a preset roundness integrity threshold value, the citrus fruit corresponding to the appointed roundness integrity numerical value is marked as an appointed citrus fruit, and a defect position of the appointed citrus fruit in the first image is acquired. By designing the roundness integrity numerical values, it can be known that the identification result corresponding to the appointed roundness integrity numerical value is the imprecise citrus identification result, namely, the appointed roundness integrity numerical value is smaller than the preset appointed roundness integrity threshold value. The appointed citrus fruit is inevitably poor in roundness degree, so that it inevitably has the defect position. The defect position is the position maximally different from the round shape, and its acquisition mode can be obtained by any feasible mode, for example, edge curve calculation, and the position with the poorest arc degree or small arc degree is marked as the defect position; or, the preset citrus image is superposed to the area of the appointed citrus fruit, and the position with the maximum difference is marked as the defect position.

A spatial position corresponding to the appointed roundness integrity numerical value is then acquired, and a first spatial range and a second spatial range are determined according to the spatial position. The step is intended to determine the first spatial range with a large range and a second spatial range with a small range, namely the first spatial range covers the whole appointed citrus fruit, and the second spatial range only covers the defect position of the appointed citrus fruit. Further, in order to implement the scheme of the application conveniently, the first spatial range can be expanded to the whole citrus tree. Of course, the first spatial range can be only confined to an appointed citrus fruit. Determining the first spatial range with a large range and the second spatial range with a small range is intended to perform subsequent precise double spray injection treatment. As double spray injection is used in the application, it is necessary to calibrate the position accurately. The second spatial range only covers the defect position of the appointed citrus fruit, which means that the second spatial range does not cover the whole appointed citrus fruit.

Further, S4 of calculating the citrus fruit areas according to a preset roundness integrity calculation method to obtain a plurality of roundness integrity numerical values respectively corresponding to the plurality of citrus fruit areas includes:

S401. binarization processing is performed on citrus fruit areas according to a preset binarization method to obtain a binarized image;

S402. a contour of citrus fruit is extracted from the binarized image, and similarity calculation is performed on the contour of citrus fruit and a preset roundness to obtain a similarity numerical value; and S403. the similarity numerical value is marked as the roundness integrity numerical value so as to obtain the plurality of roundness integrity numerical values respectively corresponding to the plurality of citrus fruit areas.

Therefore, the calculating speed of roundness integrity numerical values is increased. Binarization processing refers to dividing a pixel point numerical value in a colored image into two numerical values so as to reduce the difficulty of performing image processing by a computer and improve the processing efficiency. With respect to the citrus fruit areas, there is a great difference between citrus fruits and background. If there is no shelter, there is a remarkable difference between colors of citrus fruits and peripheral colors in color value. A round or approximately round contour can be obtained by binarization processing. On the contrary, the round contour is not obvious or has a sign of being sheltered. The contour of citrus fruit is then extracted from the binarized image, and similarity calculation is performed on the contour of citrus fruit and a preset roundness to obtain a similarity numerical value. The similarity numerical value can be taken as the roundness integrity numerical value.

As described in the steps S7-S10, both first spray injection treatment in the first spatial range and second spray injection treatment in the second spatial range are performed, wherein an atomizing raw material used in the first spray injection treatment is different from an atomizing raw material used in the second spray injection treatment; after a preset time, second-time image acquisition processing is performed on the spatial position by using the pre-arranged optical camera to obtain a second image; the second image is inputted into a preset second citrus fruit identification model to be processed to obtain a second identification result, wherein the second citrus fruit identification model is trained based on a convolutional neural network model; and a final citrus fruit identification result is generated according to the second identification result and the first citrus fruit identification result sequence.

A principle of spray injection treatment lies in that the adsorption capacities of all parts of a plant are different to spray (the reflecting capacities to rays are also different after absorbing the spray), all the more so for citrus fruits in ripe period. Therefore, the application is particularly suitable for identifying citrus fruits in ripe period. Just due to different adsorption capacities to spray, it is unable to extract fruit characteristics from the acquired citrus images in the first stage or the characteristics are not obvious and can be highlighted in the second stage, so that the identification accuracy for identification in the second stage can be improved, and in the process, it is unnecessary to change an expensive camera. Besides, the application adopts either a design of image acquisition after atomization or a design of image acquisition after double atomization, which is designed to further highlight the characteristics of the citrus fruits. As first spray injection treatment is performed on the large first spatial range and second injection treatment is performed on the small first spatial range, compared with image data in corresponding positions in the first image in the first stage, the image data acquired from the image in the second stage has a more obvious difference. There is also a difference between the first spatial range subjected to first spray injection treatment and the second spatial range subjected to second spray injection treatment, image data with three layers will be formed, which is beneficial for identification of the citrus fruits. Without doubt, a requirement for performing spray injection lies in that the atomizing raw material used in the first spray injection treatment is different from the atomizing raw material used in the second spray injection treatment, which is because if the atomizing raw materials are same, the image data of three layers cannot formed, so that first spray injection treatment is actually identical to second spray injection treatment. Thus, the atomizing raw materials shall be different. The atomizing raw materials can be adjusted according to actual needs, for example, water can be used as the atomizing raw material used in first spray injection treatment, and a ripener can be used as the atomizing raw material used in second spray injection treatment.

After a preset time, second-time image acquisition processing is performed on the spatial position by using the pre-arranged optical camera to obtain a second image. It is necessary to perform second image acquisition processing after the preset time, which is because if image acquisition is performed too early, the quality of the acquired image is deteriorated in the presence of spray, so that it is quite necessary to perform image acquisition after the preset time. The second image is the image acquired after the spray is completely adsorbed, has obviously different characteristics compared with the corresponding areas in the first image, and can be obtained without changing an image acquisition device with high precision. The second image is then inputted into a preset second citrus fruit identification model to be processed to obtain a second identification result, wherein the second citrus fruit identification model is trained based on a convolutional neural network model. It is to be noted that the second citrus fruit identification model performs identification processing on the single citrus fruit image, which is different from a condition that the first citrus fruit identification model performs identification processing on the whole citrus tree image. Correspondingly, training data used by the second citrus fruit identification model during training shall be the citrus fruit image. The convolutional neural network model for the second citrus fruit identification model can be either same with the first citrus fruit identification model or different from the citrus fruit identification model, which is not defined here. A final citrus fruit identification result is then generated according to the second identification result and the first citrus fruit identification result sequence.

Further, in the step S7 of performing both first spray injection treatment in the first spatial range and second spray injection treatment in the second spatial range, an atomizing raw material used in the first spray injection treatment being different from an atomizing raw material used in the second spray injection treatment, wherein the atomizing raw material used in the first spray injection treatment is water and the atomizing raw material used in the second spray injection treatment is a pesticide liquid.

The pesticide liquid is, for example, the ripener, or an insecticide and the like. As different atomizing raw materials: water and pesticide liquid are used, the image data of three layers are beneficially obtained during image acquisition in the second stage, which is conducive to improving the accuracy of the final identification result.

Further, in the step S7 of performing both first spray injection treatment in the first spatial range and second spray injection treatment in the second spatial range, an atomizing raw material used in the first spray injection treatment being different from an atomizing raw material used in the second spray injection treatment, wherein the atomizing raw material used in the first spray injection treatment is a first mixed liquid that is composed of water and a first powder, and the first powder can stress-emit visible light of a first color in an ultraviolet environment; and the atomizing raw material used in the second spray injection treatment is a second mixed liquid that is composed of water and a second powder, and the second powder can stress-emit visible light of a second color in an infrared environment;

the step S8 of, after a preset time, performing second-time image acquisition processing on the spatial position by using the pre-arranged optical camera to obtain a second image includes:

S801. after the preset time, a light supplementing operation for the spatial position is performed by using a preset infrared flashlight and a preset ultraviolet flashlight, and second-time image acquisition processing is performed on the spatial position by using the pre-arranged optical camera to obtain the second image.

Therefore, the image quality is further improved, and the accuracy of the final identification result is improved. The higher the image quality is, the more accurate the citrus fruit identification is. Therefore, through a design that the atomizing raw material used in the first spray injection treatment is the first mixed liquid which is composed of water and the first powder, and the first powder can stress-emit visible light of the first color in the ultraviolet environment; the atomizing raw material used in the second spray injection treatment is the second mixed liquid which is composed of water and the second powder, and the second powder can stress-emit visible light of the second color in the infrared environment, in combination of the infrared flashlight and the ultraviolet flashlight, areas adsorbing the spray can stress-emit visible light of different colors, so that the comparability of different areas is improved. Moreover, as the adsorption capacities of the citrus fruits and other areas to the spray are different, the citrus fruits can be further highlighted, and therefore, the image quality is improved effectively, and the accuracy of the citrus identification result is guaranteed. The first powder can stress-emit the visible light of the first color in the ultraviolet environment. The first powder is, for example, a SrAl2O4 powder doped with Eu ions based on a theory that band gaps of energy band structures of the material are matched with the ultraviolet light and the visible light, namely, electrons in a ground state can absorb the ultraviolet light (due to energy gap fit) and jump into high energy level. The high energy level electrons are unstable and will jump into low energy level orbits. The energy difference therebetween is stress-emitted in form of visible light (as the energy gap in the transition is matched with the wavelength of the visible light). The atomizing raw material used in the second spray injection treatment is the second mixed liquid which is composed of water and the second powder, and the second powder can stress-emit visible light of the second color in the infrared environment. The second powder is, for example, a NaYF4 powder doped with Yb and Ho and the like.

Further, the step S10 of generating a final citrus fruit identification result according to the second identification result and the first citrus fruit identification result sequence includes:

S101. an appointed member corresponding to the appointed roundness integrity numerical value is determined from the first identification result sequence according to a corresponding relation among the roundness integrity numerical value, the citrus fruit area and the first identification result;

S102. member excluding processing is performed on the first identification result sequence to remove the appointed member, so as to obtain a second sequence;

S103. the identification results that are not identified as citrus fruits are excluded from all the second identification results, so as to obtain a third sequence; and S104. the second sequence is merged with the third sequence to obtain the final citrus fruit identification result.

Therefore, the first identification result sequence with lower accuracy and the second identification result with higher accuracy are combined to obtain the final citrus fruit identification result with high credibility. Member excluding processing is performed on the first identification result sequence to remove the appointed member, so as to obtain a second sequence, so that each member in the second sequence is relatively a credible identification result. The identification results that are not identified as citrus fruits are then excluded from all the second identification results, so as to obtain a third sequence, thereby determining that members in the third sequence are exact citrus fruits; and the second sequence and the third sequence are merged to obtain the final citrus fruit identification result.

The citrus identification method based on roundness integrity correction provided by the application includes: first-time image acquisition processing is performed on a target citrus tree to obtain a first image; the first image is inputted into a preset first citrus fruit identification model to be processed to obtain a first identification result sequence; area interception processing is performed on the first image to obtain a citrus fruit area; roundness integrity numerical values are obtained; an appointed roundness integrity numerical value is selected from the plurality of roundness integrity numerical values, and a defect position of an appointed citrus fruit in the first image is acquired; a first spatial range and a second spatial range are determined; both first spray injection treatment and second spray injection treatment are performed; second-time image acquisition processing is performed to obtain a second image; the second image is inputted into a second citrus fruit identification model to be processed to obtain a second identification result; and a final citrus fruit identification result is generated according to the second identification result and the first identification result sequence. Therefore, the accuracy of citrus identification is improved.

The embodiment of the application provides a citrus identification device based on roundness integrity correction, including:

a first image acquisition unit for performing first-time image acquisition processing on a target citrus tree by using a pre-arranged optical camera to obtain a first image;

a first identification result sequence acquisition unit for inputting the first image into a preset first citrus fruit identification model to be processed to obtain a first identification result sequence, wherein the first citrus fruit identification model is trained based on a convolutional neural network model, and the first identification result sequence is a set of fruits identified as citrus fruits in the first image;

a citrus fruit area acquisition unit for performing area interception processing on the first image according to the first identification result sequence to obtain a plurality of citrus fruit areas corresponding to the first identification result sequence;

a roundness integrity calculation unit for calculating the citrus fruit areas according to a preset roundness integrity calculation method to obtain a plurality of roundness integrity numerical values respectively corresponding to the plurality of citrus fruit areas;

a defect position acquisition unit for selecting an appointed roundness integrity numerical value from the plurality of roundness integrity numerical values according to a rule that the numerical value is smaller than a preset roundness integrity threshold value, marking the citrus fruit corresponding to the appointed roundness integrity numerical value as an appointed citrus fruit, and acquiring a defect position of the appointed citrus fruit in the first image;

a spatial position acquisition unit for acquiring a spatial position corresponding to the appointed roundness integrity numerical value, and determining a first spatial range and a second spatial range according to the spatial position, wherein the first spatial range covers the whole appointed citrus fruit, and the second spatial range only covers the defect position of the appointed citrus fruit;

a spray injection unit for performing both first spray injection treatment in the first spatial range and second spray injection treatment in the second spatial range, wherein an atomizing raw material used in the first spray injection treatment is different from an atomizing raw material used in the second spray injection treatment;

a second image acquisition unit for, after a preset time, performing second-time image acquisition processing on the spatial position by using the pre-arranged optical camera to obtain a second image;

a second identification result acquisition unit for inputting the second image into a preset second citrus fruit identification model to be processed to obtain a second identification result, wherein the second citrus fruit identification model is trained based on a convolutional neural network model; and a final citrus fruit identification result acquisition unit for generating a final citrus fruit identification result according to the second identification result and the first citrus fruit identification result sequence.

Operations for execution by the units correspond to the steps of the citrus identification method based on roundness integrity correction of the above-mentioned embodiment one by one, which is not described repeatedly herein.

The citrus identification device based on roundness integrity correction provided by the application performs first-time image acquisition processing on a target citrus tree to obtain a first image; inputs the first image into a preset first citrus fruit identification model to be processed to obtain a first identification result sequence; performs area interception processing on the first image to obtain a citrus fruit area; obtains roundness integrity numerical value; selects an appointed roundness integrity numerical value from the plurality of roundness integrity numerical values, and acquires a defect position of an appointed citrus fruit in the first image; determines a first spatial range and a second spatial range; performs both first spray injection treatment and second spray injection treatment; performs second-time image acquisition processing to obtain a second image; inputs the second image into a second citrus fruit identification model to be processed to obtain a second identification result; and generates a final citrus fruit identification result according to the second identification result and the first identification result sequence. Therefore, the accuracy of citrus identification is improved.

Figure 2:
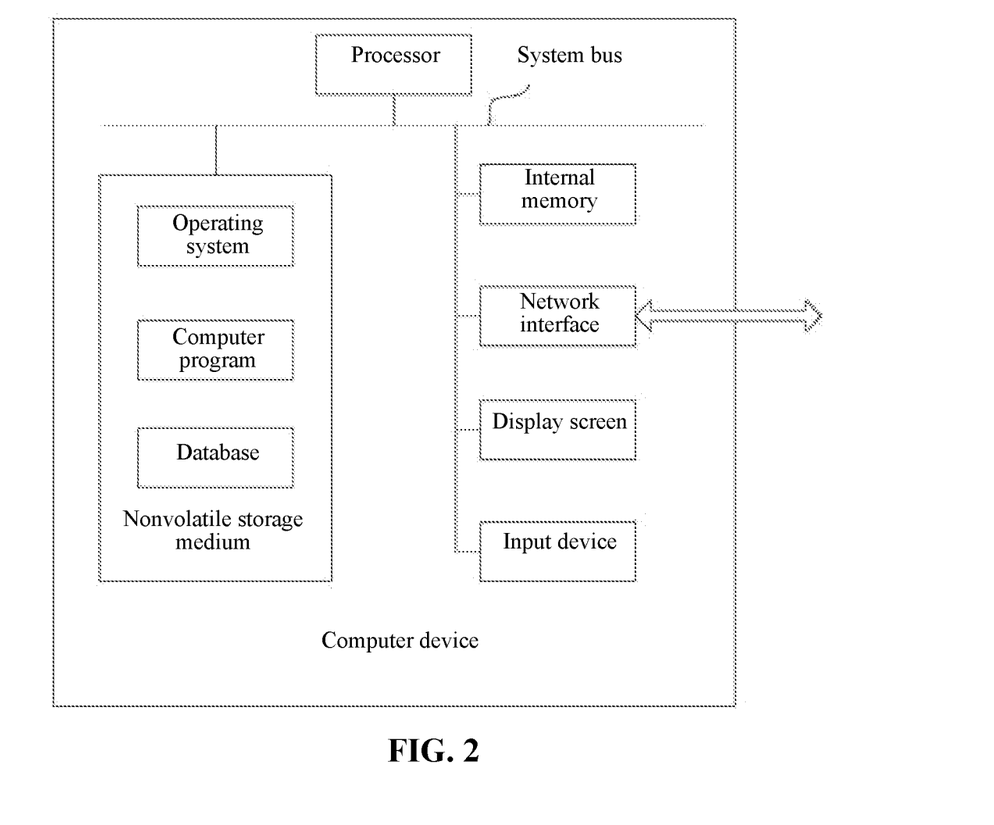
FIG. 2 is a structural schematic block diagram of the computer device of an embodiment of the application.

Referring to FIG. 2, the embodiment of the present invention further provides a computer device, wherein the computer device can be a server, the internal structure of which may be shown in a figure. The computer device includes a processor, a memory, a network interface and a database connected via a system bus. The processor designed by the computer is used for providing calculation and control abilities. The memory of the computer device includes a nonvolatile storage medium and an internal memory. The nonvolatile storage medium stores an operating system, a computer program and a database. The internal memory provides an environment for operation of the operating system and the computer program in the nonvolatile storage medium. A database of the computer device is used for storing data used for the citrus identification method based on roundness integrity correction. The network interface of the computer device is used for connected communication with an external terminal via a network. The computer program is executed by a processor to implement a citrus identification method based on roundness integrity correction.

The processor executes the citrus identification method based on roundness integrity correction, wherein the steps included in the method respectively correspond to the steps of the citrus identification method based on roundness integrity correction executing the above-mentioned embodiment one by one, which is not described repeatedly herein.

Those skilled in the art can understand that the structure illustrated in the figure is merely a block diagram of a partial structure related to the scheme of the application and does not constitute limitation to the computer device in the scheme of the application applied thereto.

The computer device provided by the application performs first-time image acquisition processing on a target citrus tree to obtain a first image; inputs the first image into a preset first citrus fruit identification model to be processed to obtain a first identification result sequence; performs area interception processing on the first image to obtain a citrus fruit area; obtains roundness integrity numerical value; selects an appointed roundness integrity numerical value from the plurality of roundness integrity numerical values, and acquires a defect position of an appointed citrus fruit in the first image; determines a first spatial range and a second spatial range; performs both first spray injection treatment and second spray injection treatment; performs second-time image acquisition processing to obtain a second image; inputs the second image into a second citrus fruit identification model to be processed to obtain a second identification result; and generates a final citrus fruit identification result according to the second identification result and the first identification result sequence. Therefore, the accuracy of citrus identification is improved.

An embodiment of the application further provides a computer readable storage medium having a computer program stored thereon. The computer program is executed by the processor to implement the citrus identification method based on roundness integrity correction, wherein the steps included in the method respectively correspond to the steps of the citrus identification method based on roundness integrity correction executing the above-mentioned embodiment one by one, which is not described repeatedly herein.

The computer readable storage medium provided by the application performs first-time image acquisition processing on a target citrus tree to obtain a first image; inputs the first image into a preset first citrus fruit identification model to be processed to obtain a first identification result sequence; performs area interception processing on the first image to obtain a citrus fruit area; obtains roundness integrity numerical value; selects an appointed roundness integrity numerical value from the plurality of roundness integrity numerical values, and acquires a defect position of an appointed citrus fruit in the first image; determines a first spatial range and a second spatial range; performs both first spray injection treatment and second spray injection treatment; performs second-time image acquisition processing to obtain a second image; inputs the second image into a second citrus fruit identification model to be processed to obtain a second identification result; and generates a final citrus fruit identification result according to the second identification result and the first identification result sequence. Therefore, the accuracy of citrus identification is improved.

Those skilled in the art can understand that implementation of all or part of flows in the method of the embodiment is completed by means of hardware related to the computer program or instruction. The computer program can be stored in a nonvolatile computer readable storage medium. When the computer program is executed, it can includes the flows of the embodiments of the methods. Any citation of the memory, storage, database or other media provided by the application and used in the embodiments can include a nonvolatile and/or volatile memory. The nonvolatile memory can include read-only memory (ROM), programmable ROM (PROM), electrical programmable ROM (EPROM), an erasable programmable ROM (EEPROM) or a flash memory. The volatile memory can include a random access memory (Ram) or an external high speed cache memory. As description rather than limitation, the RAM can be obtained in various forms, for example, a static RAM (SRAM), a dynamic RAM (DRAM), a synchronous DRAM (SDRAM), a double data rate SDRM (SSRSDRAM), an enhanced SDRAM (ESDRAM), a synchronization link (Synchlink) DRAM (SLDRAM), a memory bus (Rambus), a direct RAM (RDRAM), a direct memory bus dynamic RAM (DRDRAM), a memory bus dynamic RAM (RDRAM) and the like.

It should be noted that the terms "comprises", "include" or any other variants herein are intended to cover nonexcludable inclusion, such that the process, apparatus, article or method including a series of elements only includes the elements, but also includes other elements which are not limited clearly, or further includes all inherent elements of the process, apparatus, article or method. Under a circumstance of no more limitations, for the elements defined by the term "include one", a condition that there are additional same elements in the process, apparatus, article or method including the elements is not excluded.

The above is merely preferred embodiments of the application and does not hence limit the patent range of the application. Equivalent structure or equivalent flow conversion made by means of the contents of the description and drawings of the application are applied to other related technical fields directly or indirectly, which is, in a similar way, comprised in the protection scope of the patent of the application.

What is claimed:

1. A citrus identification method based on roundness integrity correction, comprising:
   S1. performing first-time image acquisition processing on a target citrus tree by using a pre-arranged optical camera to obtain a first image;
   S2. inputting the first image into a preset first citrus fruit identification model to be processed to obtain a first identification result sequence, wherein the first citrus fruit identification model is trained based on a convolutional neural network model, and the first identification result sequence is a set of fruits identified as citrus fruits in the first image;
   S3. performing area interception processing on the first image according to the first identification result sequence to obtain a plurality of citrus fruit areas corresponding to the first identification result sequence;
   S4. calculating the citrus fruit areas according to a preset roundness integrity calculation method to obtain a plurality of roundness integrity numerical values respectively corresponding to the plurality of citrus fruit areas;
   S5. selecting an appointed roundness integrity numerical value from the plurality of roundness integrity numerical values according to a rule that the numerical value is smaller than a preset roundness integrity threshold value, marking the citrus fruit corresponding to the appointed roundness integrity numerical value as an appointed citrus fruit, and acquiring a defect position of the appointed citrus fruit in the first image;
   S6. acquiring a spatial position corresponding to the appointed roundness integrity numerical value, and determining a first spatial range and a second spatial range according to the spatial position, wherein the first spatial range covers the whole appointed citrus fruit, and the second spatial range only covers the defect position of the appointed citrus fruit;
   S7. performing both first spray injection treatment in the first spatial range and second spray injection treatment in the second spatial range, wherein an atomizing raw material used in the first spray injection treatment is different from an atomizing raw material used in the second spray injection treatment;
   S8. after a preset time, performing second-time image acquisition processing on the spatial position by using the pre-arranged optical camera to obtain a second image;
   S9. inputting the second image into a preset second citrus fruit identification model to be processed to obtain a second identification result, wherein the second citrus fruit identification model is trained based on a convolutional neural network model; and
   S10. generating a final citrus fruit identification result according to the second identification result and the first citrus fruit identification result sequence, wherein in the S7 of performing both first spray injection treatment in the first spatial range and second spray injection treatment in the second spatial range, an atomizing raw material used in the first spray injection treatment being different from an atomizing raw material used in the second spray injection treatment, the atomizing raw material used in the first spray injection treatment is a first mixed liquid that is composed of water and a first powder, and the first powder can stress-emit visible light of a first color in an ultraviolet environment; and the atomizing raw material used in the second spray injection treatment is a second mixed liquid that is composed of water and a second powder, and the second powder can stress-emit visible light of a second color in an infrared environment;

the step S8 of, after a preset time, performing second-time image acquisition processing on the spatial position by using the pre-arranged optical camera to obtain a second image comprises:
   S801. after the preset time, performing a light supplementing operation for the spatial position by using a preset infrared flashlight and a preset ultraviolet flashlight, and performing second-time image acquisition processing on the spatial position by using the pre-arranged optical camera to obtain the second image.

2. The citrus identification method based on roundness integrity correction according to claim 1, wherein before the step S2 of inputting the first image into a preset first citrus fruit identification model to be processed to obtain a first identification result sequence, the first citrus fruit identification model being trained based on a convolutional neural network model, and the first identification result sequence being a set of fruits identified as citrus fruits in the first image, the method comprising:
   S11. performing integral image acquisition processing on a plurality of preset sample citrus trees to obtain a plurality of first sample tree images;
   S12. performing first manual marking processing on the plurality of first sample tree images to mark citrus fruits on each of the first sample tree images, and marking the first sample tree images after first manual marking processing so as to obtain a plurality of second sample tree images;
   S13. dividing the plurality of second sample tree images according to a preset rule to obtain a plurality of training tree images and a plurality of verifying tree images;
   S14. invoking a preset Faster R-CNN model, and inputting the plurality of training tree images into the Faster R-CNN model to be trained to obtain an intermediate model;
   S15. verifying the intermediate model by utilizing the plurality of verifying tree images to obtain a verification result, and judging whether the verification result is that the intermediate model passes the verification or not; and
   S16. marking the intermediate model as the first citrus fruit identification model if the verification result is that the intermediate model passes the verification.

3. The citrus identification method based on roundness integrity correction according to claim 1, wherein the step S4 of calculating the citrus fruit areas according to a preset roundness integrity calculation method to obtain a plurality of roundness integrity numerical values respectively corresponding to the plurality of citrus fruit areas comprises:

S401. performing binarization processing on the citrus fruit areas according to a preset binarization method to obtain a binarized image;

S402. extracting a contour of citrus fruit from the binarized image, and performing similarity calculation on the contour of citrus fruit and a preset roundness to obtain a similarity numerical value; and S403. marking the similarity numerical value as the roundness integrity numerical value so as to obtain the plurality of roundness integrity numerical values respectively corresponding to the plurality of citrus fruit areas.

4. The citrus identification method based on roundness integrity correction according to claim 1, wherein in the step S7 of performing both first spray injection treatment in the first spatial range and second spray injection treatment in the second spatial range, an atomizing raw material used in the first spray injection treatment being different from an atomizing raw material used in the second spray injection treatment, the atomizing raw material used in the first spray injection treatment is water and the atomizing raw material used in the second spray injection treatment is a pesticide liquid.

5. The citrus identification method based on roundness integrity correction according to claim 1, wherein the step S10 of generating a final citrus fruit identification result according to the second identification result and the first citrus fruit identification result sequence comprises:

S101. determining an appointed member corresponding to the appointed roundness integrity numerical value from the first identification result sequence according to a corresponding relation among the roundness integrity numerical value, the citrus fruit area and the first identification result;

S102. performing member excluding processing on the first identification result sequence to remove the appointed member, so as to obtain a second sequence;

S103. excluding the identification results that are not identified as citrus fruits from all the second identification results, so as to obtain a third sequence; and S104. merging the second sequence with the third sequence to obtain the final citrus fruit identification result.

6. A citrus identification device based on roundness integrity correction, comprising:

a first image acquisition unit for performing first-time image acquisition processing on a target citrus tree by using a pre-arranged optical camera to obtain a first image;

a first identification result sequence acquisition unit for inputting the first image into a preset first citrus fruit identification model to be processed to obtain a first identification result sequence, wherein the first citrus fruit identification model is trained based on a convolutional neural network model, and the first identification result sequence is a set of fruits identified as citrus fruits in the first image;

a citrus fruit area acquisition unit for performing area interception processing on the first image according to the first identification result sequence to obtain a plurality of citrus fruit areas corresponding to the first identification result sequence;

a roundness integrity calculation unit for calculating the citrus fruit areas according to a preset roundness integrity calculation method to obtain a plurality of roundness integrity numerical values respectively corresponding to the plurality of citrus fruit areas;

a defect position acquisition unit for selecting an appointed roundness integrity numerical value from the plurality of roundness integrity numerical values according to a rule that the numerical value is smaller than a preset roundness integrity threshold value, marking the citrus fruit corresponding to the appointed roundness integrity numerical value as an appointed citrus fruit, and acquiring a defect position of the appointed citrus fruit in the first image;

a spatial position acquisition unit for acquiring a spatial position corresponding to the appointed roundness integrity numerical value, and determining a first spatial range and a second spatial range according to the spatial position, wherein the first spatial range covers the whole appointed citrus fruit, and the second spatial range only covers the defect position of the appointed citrus fruit;

a spray injection unit for performing both first spray injection treatment in the first spatial range and second spray injection treatment in the second spatial range, wherein an atomizing raw material used in the first spray injection treatment is different from an atomizing raw material used in the second spray injection treatment, wherein the atomizing raw material used in the first spray injection treatment is a first mixed liquid that is composed of water and a first powder, and the first powder can stress-emit visible light of a first color in an ultraviolet environment and the atomizing raw material used in the second spray injection treatment is a second mixed liquid that is composed of water and a second powder, and the second powder can stress-emit visible light of a second color in an infrared environment;

a second image acquisition unit for, after a preset time, performing second-time image acquisition processing on the spatial position by using the pre-arranged optical camera to obtain a second image, wherein the second image acquisition unit is further configured to perform a light supplementing operation for the spatial position by using a preset infrared flashlight and a preset ultraviolet flashlight, and performing second-time image acquisition processing on the spatial position by using the pre-arranged optical camera to obtain the second image;

a second identification result acquisition unit for inputting the second image into a preset second citrus fruit identification model to be processed to obtain a second identification result, wherein the second citrus fruit identification model is trained based on a convolutional neural network model; and a final citrus fruit identification result acquisition unit for generating a final citrus fruit identification result according to the second identification result and the first citrus fruit identification result sequence.

* * * * *